US008438590B2

(12) United States Patent
Crenshaw

(10) Patent No.: US 8,438,590 B2
(45) Date of Patent: May 7, 2013

(54) SYSTEM AND METHOD FOR MEASURING AUDIENCE REACTION TO MEDIA CONTENT

(75) Inventor: James E. Crenshaw, Burbank, CA (US)

(73) Assignee: General Instrument Corporation, Horsham, PA (US)

(*) Notice: Subject to any disclaimer, the term of this patent is extended or adjusted under 35 U.S.C. 154(b) by 222 days.

(21) Appl. No.: 12/887,571

(22) Filed: Sep. 22, 2010

(65) Prior Publication Data

US 2012/0072939 A1 Mar. 22, 2012

(51) Int. Cl.
*H04N 60/33* (2006.01)

(52) U.S. Cl.
USPC ............................................. 725/10; 725/12

(58) Field of Classification Search ............ 725/10, 725/12
See application file for complete search history.

(56) References Cited

U.S. PATENT DOCUMENTS

| | | | |
|---|---|---|---|
| 5,483,278 A | 1/1996 | Strubbe et al. | |
| 5,676,138 A | 10/1997 | Zawilinski | |
| 5,694,162 A | 12/1997 | Freeny, Jr. | |
| 5,774,591 A | 6/1998 | Black et al. | |
| 6,134,531 A | 10/2000 | Trewitt et al. | |
| 6,400,996 B1 | 6/2002 | Hoffberg et al. | |
| 6,434,398 B1 | 8/2002 | Inselberg | |
| 6,585,521 B1* | 7/2003 | Obrador | 434/236 |
| 2003/0005431 A1 | 1/2003 | Shinohara | |
| 2003/0093784 A1 | 5/2003 | Dimitrova et al. | |
| 2003/0101449 A1 | 5/2003 | Bentolila et al. | |
| 2003/0200543 A1 | 10/2003 | Burns | |
| 2004/0210923 A1* | 10/2004 | Hudgeons et al. | 725/24 |
| 2007/0150916 A1 | 6/2007 | Begole et al. | |
| 2008/0183560 A1 | 7/2008 | Kaplan et al. | |
| 2009/0094286 A1 | 4/2009 | Lee et al. | |

FOREIGN PATENT DOCUMENTS

| | | |
|---|---|---|
| EP | 1582965 A1 | 10/2005 |
| WO | 2010060146 A1 | 6/2010 |

OTHER PUBLICATIONS

M Scott, "This Computer may be Too Smart", Bloomberg, BusinessWeek, Technology, Jul. 2006.
"Samsung Integrates TruMedia Audience Measurement into MagicInfo Player", DigitalSignageToday.com, Nov. 2008.
"TNS Media Research Launches DIRECTViewTM—Further Advancing RPD Measurement in the U.S.", TNS Media Research, News & Press Release, Jan. 2009.
PCT Search Report & Written Opinion, Re: Application #PCT/US2011/049853; Nov. 10, 2011.

* cited by examiner

*Primary Examiner* — Hunter B Lonsberry
(74) *Attorney, Agent, or Firm* — Lori Anne D. Swanson

(57) ABSTRACT

A system and method of measuring audience reaction to media content includes obtaining images or other information of each individual of the audience as the individual views the content and analyzing the images or other information with software to generate emotional response source data for each individual. The emotional response source data identifies the emotion or emotions or change of emotions of the individual as interpreted by the software. The emotional response source data of the individuals is aggregated to identify a set of primary emotions of the audience, and thereafter, the emotional response source data is re-evaluated in view of the primary emotions to refine and more accurately classify the emotional responses of each individual of the audience.

20 Claims, 3 Drawing Sheets

SYSTEM AND METHOD FOR MEASURING AUDIENCE REACTION TO MEDIA CONTENT

FIELD

A system and method for measuring the emotion, mood or reaction of an audience as the audience views an image, video, program, advertisement, presentation, or like visual display is disclosed, and more particularly, a system and method for evaluating and determining the emotion, emotions, or change of emotions of each individual in the audience by analyzing facial movements, expressions, gestures, body language or the like are disclosed.

BACKGROUND

Audience reaction to media content, advertisements, commercials, television programs, movies or other programming, and like visual displays provides valuable information desired by advertisers, content providers, producers, and like entities responsible for the media content. Such entities expend considerable amounts of time, effort and expense with respect to obtaining advanced analysis of audience reaction. Conventional methods typically rely on results obtained by querying a small group of people after having viewed the content, and such results typically take time to compile and analyze and can be expensive to obtain.

Accordingly, an efficient method for gauging or measuring audience reaction to media content, advertisements, commercials, television broadcasts, movies or other programming, and like visual displays viewed by a relatively-large, diverse and widespread audience in a relatively-short period of time, such as in substantially real-time, is desired.

SUMMARY

This disclosure describes a system for measuring audience reaction to media content. According to one contemplated embodiment of the system, a terminal network device having a receiver connected to a network such that transmissions of media content including video are received by the terminal network device and the media content is playable by the terminal network device on a display monitor connected to the terminal network device thereby permitting the media content to be viewed by an individual at a remote end user location where the terminal network device is physically located. The terminal network device has an input for receiving information obtained from a sensor concerning an emotional response of the individual at the end user location as the individual views the media content. The terminal network device also has a transmitter for transmitting emotional response information of the individual via a return path on the network.

This disclosure also describes a system for measuring audience reaction to media content in which an audience reaction server is connected to a network at a headend location of the network remote from end user terminal locations where individuals forming an audience view media content including video. The audience reaction server has at least one microprocessor with software for aggregating emotional responses of the individuals of the audience determined at the end user terminal locations as the individuals view the media content to identify an emotional response of the audience as a whole during at least one predetermined segment of the media content displayed to the individuals.

This disclosure further describes a method of measuring audience reaction to media content. For each individual of an audience, a condition of the individual sensed as the individual views the media content is received and analyzed electronically with software to generate emotional response source data of the individual corresponding to at least one predetermined segment of the media content. The emotional response source data identifies an emotional response of the individual as interpreted by the software. Thereafter, the emotional response source data of each individual is re-evaluated in view of information of aggregate emotional response source data of audience reaction as a whole to refine and more accurately classify the emotional response of each individual of the audience to generate re-evaluated emotional response data for each individual.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

Figure 1:
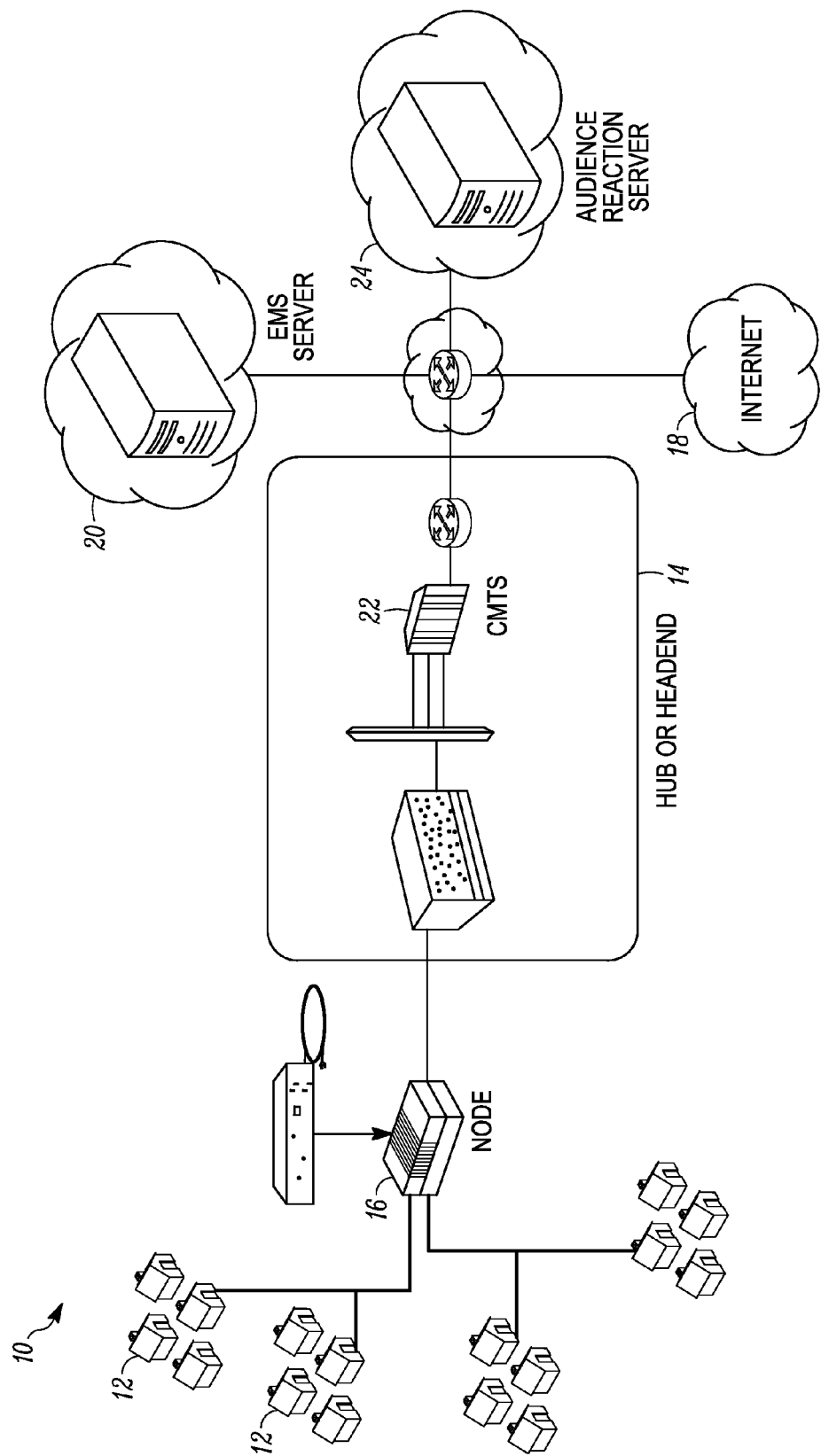
FIG. 1 is a diagram of a network on which a method of measuring audience emotion can be implemented.

Before turning to detailed descriptions with respect to measuring audience emotion, a description of one contemplated embodiment with respect to implementing an audience emotion measuring system and method is provided. For this purpose and by way of example, FIG. 1 illustrates an exemplary network 10, such as a Hybrid Fiber Coaxial (HFC) cable television system network. The network 10 includes a headend 14 which provides communications in upstream and downstream directions between end users in the network and the headend 14.

The headend 14 typically contains a Cable Modem Termination System (CMTS) unit 22 that hosts downstream and upstream ports and that contains numerous receivers, each receiver handling communications between hundreds of end user locations 12 having terminal network elements. Examples of terminal network elements include cable modems, set top boxes, televisions equipped with set top boxes, Data Over Cable Service Interface Specification (DOCSIS) terminal devices, media terminal adapters (MTA), and the like. The headend 14 typically connects to several intermediate nodes 16 and the nodes 16 connect to the terminal network elements. For instance, a single node may be connected to hundreds of terminal network elements.

As shown in FIG. 1, the headend 14 also interconnects to an IP (Internet Protocol) network 18, an Element Management System (EMS) server 20, and any other desired equipment or network. For example, the headend 14 can interconnect to an audience reaction server 24 or cloud having a receiver and transmitter or like equipment. Thus, media content, which may include television programming broadcasts, commercials, advertisements, or any other visual image or video displays can be transmitted via the headend 14 in downstream communications to a large number of end users at widespread locations via the HFC network 10, and communications, such as audience reaction communications, can be transmitted to the headend 14 via upstream (return path) communications and provided to the audience reaction server 24 or associated equipment.

In the above referenced manner, the audience can include many end-users at remote, wide-spread locations and feedback can be obtained quickly and/or substantially in real-time. For purposes of this disclosure, "real-time" includes a level of responsiveness that is sufficiently fast, for instance, to keep up with a series of images captured by the system as well as a level of responsiveness that tolerates a degree of lateness. Alternatively, the system does not need to operate in real-time and feedback can be obtained with expected delays. For instance, feedback via return-path transmissions can be provided during low usage or off-peak times of the network or equipment. Further, media content can be viewed at different times by different members of the audience with feedback following by a set date or time.

Figure 2:
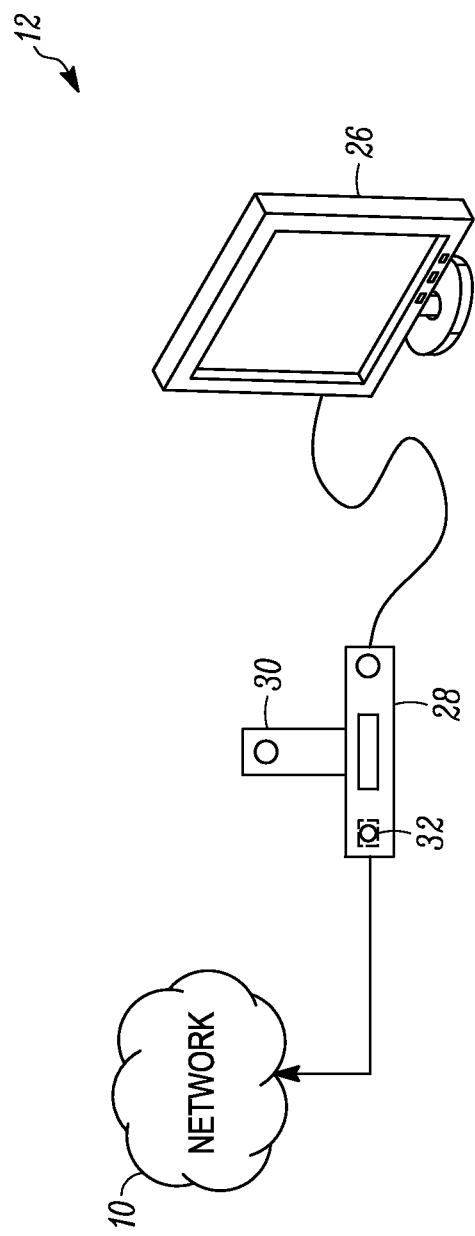
FIG. 2 is a diagram showing the equipment at the viewer's location used for the method of measuring audience emotion.

Each individual within the above referenced audience need not congregate at one location. Rather, each individual may be physically located at their home or other location that is convenient to the individual and that is connected to the network 10. Thus, the audience is not necessarily gathered at a single location in the traditional sense and is not limited to any particular size. For example, a television, computer or the like device having a monitor 26 at the individual's home is connected to the network 10 via a terminal network device, such as a set top box 28 shown in FIG. 2. The set top box 28 includes a receiver for receiving transmissions via the network 10, and the set top box 28 enables audio and video content and programming to be played and displayed on the monitor 26. Thus, the individual may be located at their home watching their own television, computer or other monitor 26 and form part of the defined audience. This also enables each member of the audience to view the media content at a convenient time, and not necessarily at the same time.

The terminal network device, such as the set top box 28, is provided with information from a sensor 30 concerning the individual's reaction or emotional response to media content as the individual views the media content. The sensor 30 can be one or more of various different types of sensors for sensing or measuring any number of different conditions of the individual. For example, in one contemplated embodiment the sensor 30 is one or more cameras, digital camera, video camera, webcam or other electronic device for capturing a series of still images or streaming video of an individual located in front of the television, computer or like monitor 26 watching the content or programming displayed on the monitor 26. Other embodiments of sensor 30 include sensors worn by an individual for purposes of measuring a physical parameter or condition of the individual's reaction to the media content. For instance, a wrist strap or the like worn by the individual could be used to measure heart rate, skin conductivity and/or other condition. Audio sensors could also be used to monitor the individual's statements or the like made in reaction to the media content. Thus, one or more types of sensors are used to monitor the reaction of the individual to the media content and this information is provided to the set top box 28.

Figure 3:
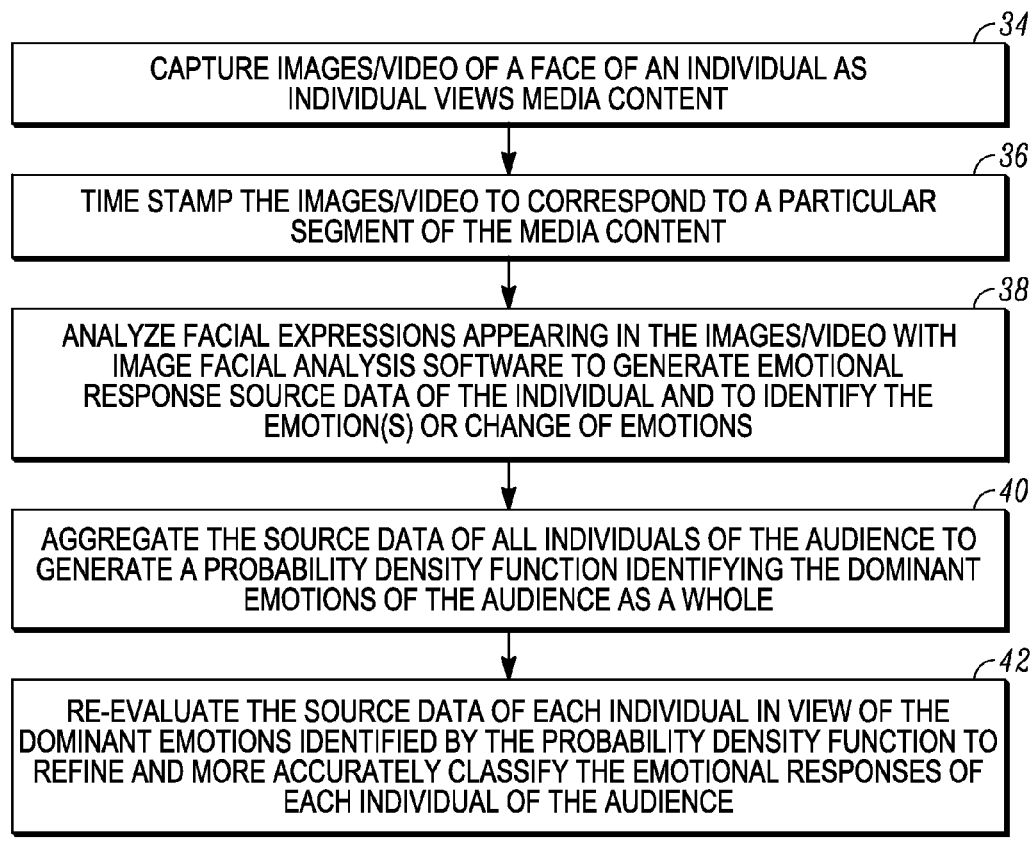
FIG. 3 is a block diagram of method steps for the method of measuring audience emotion.

For embodiments in which the sensor 30 includes a camera or like device, the camera can be built directly into or form an integral part of the terminal network device, such as the set top box 28. Alternatively, the camera or other sensor 30 can be a device separate from the set top box 28 and can transmit information to the set top box 28, for instance, via a cable connection or via wireless communication. In some contemplated embodiments, the camera or like sensor 30 is arranged so that it is focused on the face of the individual watching the content or programming so that a series of images and/or video can be captured of the face of the individual as the individual watches the content or programming during the duration of the content or programming. See step 34 in FIG. 3. The camera or cameras could also be arranged to capture images of the individual's body for purpose of obtaining information concerning gestures or body language of the individual as he/she watches the media content.

The sensor and/or the network device 28 performs a function of time-stamping the information obtained concerning the individual's reaction or emotional response to the media content as the individual views the media content. For example, images or video captured by a camera could be time-stamped. Thus, a particular set of images or video captured and stored is time-stamped or otherwise marked as corresponding to a particular segment or point in time of the content or programming viewed. See step 36 in FIG. 3. Of course, other information captured by other sensors 30 could also be time-stamped accordingly. This ensures that the information gained from the sensors 30 is tied directly to the particular segment of the program for use in subsequent analysis.

According to one example, a series of captured images or a subset of the frames of the captured video is subject to image analysis, such as image facial analysis. See step 38 in FIG. 3. Facial analysis refers to the extraction from video sequences or the like of information concerning the location of the head, its pose, and the movement of facial features such as the eyes and the mouth. The facial expressions revealed by the images are electronically analyzed with software using pattern-matching technology to recognize emotions, for instance, sadness, happiness, laughter, indifference, confusion, interest, loss of interest, concentration, frustration, anger, and fear among many other well known emotions. For instance, the software is programmed to identify numerous facial feature movements, such as a raised eyebrow, furrowed brow, corner of mouth down, teeth showing, or the like. These movements are analyzed and are used to identify a person's mood or emotion, or the occurrence of a change of emotion at any instance of time.

The use of this so-called "affective computing" provides a technology for recognizing the emotion of an individual and can be applied to images of an individual taken while the individual watches media content, such as a commercial, television program or the like, to gain information concerning the emotional state or mood of the individual as he/she watches the program. Of course, other sensing can be used in an attempt to recognize the emotions of an individual, such as the wrist strap, audio sensors or other sensors discussed above.

The software can be provided on a microprocessor 32 or the like which is mounted on the sensor 30 or within the network device, such as the set top box 28. A set top box 28 or like terminal network device is particularly well-suited and can be readily provided with sufficient computing horsepower to handle this operation. Thus, the affective computing, such as provided by facial analysis or other analysis, can be performed at the physical location of the viewer, such as via the set top box 28, with the results of the analysis transmitted in a return path via network 10 to the audience reaction server 24 or like equipment. By way of example, the emotional response of the individual to a portion of the media content as determined by the affective computing can be transmitted to the audience reaction server 24 along with selected other data relating to the result and/or the analysis. For instance, the result (i.e. determination of emotional response) may be transmitted with a representative image of the individual or time-stamped sequence of detected facial responses showing eyebrow up, corner of mouth down, teeth showing or the like used to obtain and verify the result.

As an alternative configuration, the image analysis software can be contained by the audience reaction server 24 and the raw data provided by the sensor or sensors 30, such as images or video of the individual or like measurements, readings, or recordings of the individual, can be transmitted by the terminal network device to the audience reaction server 24 where the software performs the analysis and stores the generated emotional response data for each individual. The only limitation with this arrangement is with respect to bandwidth concerning these upstream, return-path transmissions on the network. However, if bandwidth is not a problem, then this provides a useable configuration.

The above arrangements permit the emotional response or responses of each individual (regardless of type of sensor used) to be measured and tracked during the course of the program being viewed. The emotional responses are time-stamped or otherwise known for each segment of the program viewed and the emotional state of each individual is known for each segment as well as any changes in emotional state. Thus, this information not only provides an indication of the individual's overall reaction to the program being viewed, it also provides information as to which segments of the program cause specific emotional responses and/or changes in emotional responses. Such information can be used by advertisers, content providers, producers, or like entities so that they may tailor their content accordingly or make changes where a desired emotional response or change in emotional response is not shown by the audience.

The emotional response source data originally generated and collected by the system for an individual of the audience can be considered a so-called "weak classifier" of emotion. For example, this can be because analyzing facial expressions of an individual and accurately predicting the actual emotional response of the individual is not without some degree of difficulty. For instance, some emotions involve similar facial expressions and the results of a facial analysis may result in the emotional response being one of several possible emotional responses. According to one contemplated embodiment of the method disclosed herein, further steps are taken to improve the reliability and accuracy of the emotional response source data for each individual of the audience.

The emotional response source data corresponding to each individual within the audience is transmitted to the audience reaction server 24 or other equipment that electronically aggregates the data to produce an aggregate emotional response of the audience as a whole. See step 40 in FIG. 3. This aggregate information can be used to create a probability density function of emotions of the audience for each segment of program viewed. The probability density function of the aggregate data quickly identifies which emotions of the audience as a whole are considered primary or dominant emotions with respect to any given segment of the program. For instance, the probability density function may reveal that the emotional response of the audience at a given period of time during the program is basically limited to one of three specifically identified emotions. In this example, any emotion other than the three dominant emotions may likely be the result of incorrect analysis.

For purposes of example, any emotional response which is experienced by at least 10% or 20% of the audience may be considered a primary or dominant emotion and may be considered an accurate assessment of emotional response. Accordingly, an emotional response that is identified for only 1%, 2% or less than 5% of the audience may be considered an inaccurate assessment or, at least, the images may require re-evaluation. Of course, the above referenced percentages are provided merely for purposes of example and these percentages may be increased or decreased according to the desires of the user.

In this system, the aggregate data can be used and subject to a machine learning algorithm to form a "strong classifier" of emotional response since the aggregate data is comprised of a combination of many data points in comparison to the emotional response source data originally generated and collected by the system separately for each individual of the audience. The emotional response source data originally generated and collected by the system for each individual of the audience is re-analyzed based on the "strong classifier" information ascertained from the aggregate data. See step 42 in FIG. 3. For example, an emotion identified in the source data that does not correspond to that of a pre-determined percentage in the probability density function of the aggregate data may be considered a false or incorrect reading or a reading which requires re-evaluation. It is possible that the original determination of emotional response is accurate and that it is an emotional response that few individuals of the audience shared. Re-evaluation of the original data relative to that learned from the aggregate data aids in the final determination. Thus, at the individual data level, the original source data is re-analyzed and revised based on the strong classifier information determined from the aggregate data.

During the re-analyzing process, the "strong classifier" information such as determined by way of the probability density function can be fed back into image facial analysis software. This software can reside on the sensor 30 or terminal network device 28 at the individual's location or can reside on the audience reaction server 24 located or connected to the headend 14 of the network 10 as discussed above. Emotions identified by the emotional response source data are re-evaluated and may or may not be reclassified as an emotion corresponding to one of the primary or dominant emotions. The result is a more accurate classification of emotions at the individual data level. The re-analyzed and re-classified individual data is then saved as a final emotional response determination for the individual.

The determination of emotional response made from the re-analyzed emotional response data of each individual can be saved and provided to content providers, advertisers, producers, and like entities for their use in considering changes to their content for purposes of obtaining a desired response. In addition, the re-analyzed emotional response data of each individual can be aggregated again to produce more accurate aggregate data. Further, the same audience can be re-shown the program with changes made thereto customized based on the results obtained from the first viewing. The results can be used to determine whether or not the changes to the program provide a predictable desired improvement with respect to audience emotion or reaction.

While the principles of the invention have been described above in connection with specific devices, systems, and methods, it is to be clearly understood that this description is made only by way of example and not as limitation on the scope of the invention as defined in the appended claims.

I claim:

1. A system for measuring audience reaction to media content, the system comprising:
    a terminal network device having:
        a receiver connectable to a network such that transmissions of media content including video is receivable by said terminal network device and such that the media content is playable on a display monitor connectable to said terminal network device permitting the media content to be viewable by an individual at a remote end user location where said terminal network device is located,
        an input for receiving data obtained by a sensor relating to an emotional response of the individual as the individual views the media content, and
        a transmitter for transmitting information of the emotional response of the individual in a return path on the network to an audience reaction server for receiving the transmissions of the emotional response from said terminal network device, said audience reaction server having software for aggregating emotional responses of individuals forming an audience to generate a probability density function identifying emotional responses of the audience as a whole during at least one predetermined segment of the media content.

2. A system according to claim 1, wherein the data receivable by the terminal network device is a series of images of a face of the individual at the end user location as the individual views the media content.

3. A system according to claim 2, wherein said terminal network device includes at least one microprocessor having image facial analysis software for analyzing facial expressions appearing in the series of images to generate emotional response source data of the individual corresponding to at least one predetermined segment of the media content, the emotional response source data identifying the emotional response of the individual as interpreted by said image facial analysis software.

4. A system according to claim 3, wherein said at least one microprocessor of said terminal network device has software for re-evaluating the emotional response source data in view of information obtained from aggregate emotional response source data of audience reaction receivable by said terminal network device via the network to re-evaluate and more accurately classify the emotional response of the individual.

5. A system according to claim 1, wherein said terminal network device is a set top box.

6. A system according to claim 5, wherein said set top box is connectable to a cable television network whereby the transmissions of media content is received by a receiver of said set top box via downstream transmissions on the cable television network and the transmission of the emotional response is transmitted by said transmitter of said set top box via return path transmission on the cable television network.

7. A system for measuring audience reaction to media content, the system comprising:
    an audience reaction server connectable to a network at a headend location of the network remote from end user terminal locations where individuals forming an audience view media content including video, said audience reaction server having at least one microprocessor with software for aggregating data of emotional responses of the individuals of the audience obtained at the end user terminal locations as the individuals view the media content to identify an emotional response of the audience as a whole during at least one predetermined segment of the media content displayed to the individuals, wherein said software generates a probability density function of emotional responses.

8. A system according to claim 7, wherein said audience reaction server has a receiver for receiving transmissions of emotional response source data from each of the end user terminal locations.

9. A system according to claim 7, wherein said audience reaction server has a transmitter for transmitting information concerning the emotional response of the audience as a whole to each of the end user terminal locations.

10. A system according to claim 7, further comprising a terminal network device at each of said end user terminal locations having a receiver connectable to the network such that transmissions of the media content is receivable by said terminal network device and such that the media content is playable on a display monitor connectable to said terminal network device permitting the media content to be viewable by the individual at the terminal end user location where said terminal network device is located, said terminal network device having a sensor for capturing a series of images of the individual at the terminal end user location as the individual views the media content, and the terminal network device having a transmitter for transmitting the emotional response of the individual in a return path on the network to the audience reaction server.

11. A system according to claim 10, wherein each of said terminal network devices is a set top box, and wherein said set top boxes and said audience reaction server are connected to a cable television network whereby the transmission of media content is received by said set top boxes via downstream transmissions on the cable television network and the transmissions of the emotional responses by said set top boxes are via return path transmissions on the cable television network.

12. A method of measuring audience reaction to media content, comprising:
    for each individual of an audience, receiving information sensed from an individual as the individual views the media content including video;
    analyzing the information received during said receiving electronically with software to generate emotional response source data of the individual corresponding to at least one predetermined segment of the media content, the emotional response source data identifying an emotional response of the individual as interpreted by the software; and
    re-evaluating the emotional response source data of each individual in view of information concerning aggregate emotional response source data of audience reaction as a whole to accurately classify the emotional response of each individual of the audience to generate re-evaluated emotional response data for each individual.

13. A method according to claim 12, wherein said information obtained during said receiving is a series of images of the individual.

14. A method according to claim 13, wherein said series of images of the individual include images of a face of the individual, and wherein said software is image facial analysis software.

15. A method according to claim 12, wherein said receiving, analyzing and re-evaluating are performed by a terminal network device.

16. A method according to claim 15, where said terminal network device is a set top box connected to a cable television network.

17. A method according to claim 15, wherein the individuals comprising the audience are located at different remote locations with one of said terminal network device being located at each location, and wherein the media content is transmitted via the network via downstream transmissions to said terminal network devices at each of the different remote locations for displaying the media content on a monitor connected to the terminal network device.

18. A method according to claim 17, wherein the media content is a television broadcast, and wherein the different locations are homes of the individuals connected to the network.

19. A method according to claim 12, further comprising electronically transmitting the emotional response source data from a terminal network device via a return path on a network to an audience reaction server which performs a step of aggregating the emotional response source data of the individuals comprising the audience electronically to generate an emotional response of the audience as a whole during the at least one predetermined segment of the media content.

20. A method according to claim 19, wherein said re-evaluating step is performed electronically with software, and wherein, during said re-evaluating step, an emotion identified by the emotional response source data that does not correspond to at least one primary emotion identified by said emotional response of the audience as a whole is re-evaluated and re-classified as one the at least one primary emotion.

\* \* \* \* \*